United States Patent
Tveito et al.

(10) Patent No.: US 12,125,137 B2
(45) Date of Patent: Oct. 22, 2024

(54) ROOM LABELING DRAWING INTERFACE FOR ACTIVITY TRACKING AND DETECTION

(71) Applicant: Electronic Caregiver, Inc., Las Cruces, NM (US)

(72) Inventors: Judah Tveito, Las Cruces, NM (US); Bryan John Chasko, Las Cruces, NM (US); Hannah S. Rich, Las Cruces, NM (US)

(73) Assignee: Electronic Caregiver, Inc., Las Cruces, NM (US)

( * ) Notice: Subject to any disclaimer, the term of this patent is extended or adjusted under 35 U.S.C. 154(b) by 41 days.

(21) Appl. No.: 17/317,750

(22) Filed: May 11, 2021

(65) Prior Publication Data

US 2021/0358202 A1  Nov. 18, 2021

Related U.S. Application Data

(60) Provisional application No. 63/024,375, filed on May 13, 2020.

(51) Int. Cl.
*G06T 15/20* (2011.01)
*G06N 3/084* (2023.01)
(Continued)

(52) U.S. Cl.
CPC .......... *G06T 15/205* (2013.01); *G06N 3/084* (2013.01); *G06N 20/00* (2019.01); *G06T 11/203* (2013.01);
(Continued)

(58) Field of Classification Search
CPC ...... G06T 15/205; G06T 11/203; H04W 4/38; H04W 4/33; G08B 21/0476;
(Continued)

(56) References Cited

U.S. PATENT DOCUMENTS 5,211,642 A   5/1993  Clendenning
5,475,953 A  12/1995  Greenfield
(Continued)

FOREIGN PATENT DOCUMENTS

AU  2019240484 B2  11/2021
CA     2949449 A1  11/2015
(Continued)

OTHER PUBLICATIONS

C. Sardianos et al., "A model for predicting room occupancy based on motion sensor data," 2020 IEEE International Conference on Informatics, IoT, and Enabling Technologies (ICIoT), Doha, Qatar, 2020, pp. 394-399, doi: 10.1109/ICIoT48696.2020.9089624. (Year: 2020).*

(Continued)

*Primary Examiner* — Charles L Beard
(74) *Attorney, Agent, or Firm* — Carr & Ferrell LLP

(57) ABSTRACT

Exemplary embodiments include an intelligent secure networked architecture configured by at least one processor to execute instructions stored in memory, the architecture comprising a data retention system and a machine learning system, a web services layer providing access to the data retention and machine learning systems, an application server layer that provides a user-facing application that accesses the data retention and machine learning systems through the web services layer and performs processing based on user interaction with an interactive graphical user interface provided by the user-facing application, the user-facing application configured to execute instructions for a method for room labeling for activity tracking and detection, the method including making a 2D sketch of a first room on an interactive graphical user interface, and using machine learning to turn the 2D sketch of the first room into a 3D model of the first room.

20 Claims, 4 Drawing Sheets

(51) Int. Cl.
| | |
|---|---|
| *G06N 20/00* | (2019.01) |
| *G06T 11/20* | (2006.01) |
| *G08B 21/04* | (2006.01) |
| *H04L 65/1063* | (2022.01) |
| *H04L 67/02* | (2022.01) |
| *H04W 4/33* | (2018.01) |
| *H04W 4/38* | (2018.01) |

(52) U.S. Cl.
CPC ..... *G08B 21/0476* (2013.01); *G08B 21/0492* (2013.01); *H04L 65/1063* (2013.01); *H04L 67/02* (2013.01); *H04W 4/33* (2018.02); *H04W 4/38* (2018.02)

(58) Field of Classification Search
CPC .... G08B 21/0492; G06N 20/00; G06N 3/084; H04L 65/1063; H04L 67/02
See application file for complete search history.

(56) References Cited

U.S. PATENT DOCUMENTS

| | | | |
|---|---|---|---|
| 6,665,647 B1 | 12/2003 | Haudenschild | |
| 7,233,872 B2 | 6/2007 | Shibasaki et al. | |
| 7,445,086 B1 | 11/2008 | Sizemore | |
| 7,612,681 B2 | 11/2009 | Azzaro et al. | |
| 7,971,141 B1 | 6/2011 | Quinn et al. | |
| 8,206,325 B1 | 6/2012 | Najafi et al. | |
| 8,771,206 B2 | 7/2014 | Gettelman et al. | |
| 9,317,916 B1 | 4/2016 | Hanina et al. | |
| 9,591,996 B2 | 3/2017 | Chang et al. | |
| 9,972,187 B1 | 5/2018 | Srinivasan et al. | |
| 10,073,612 B1* | 9/2018 | Hale | G06F 3/0485 |
| 10,078,956 B1* | 9/2018 | Kusens | H04N 7/188 |
| 10,147,184 B2* | 12/2018 | Kusens | G08B 21/0476 |
| 10,225,522 B1* | 3/2019 | Kusens | H04N 23/60 |
| 10,347,052 B2* | 7/2019 | Hemani | G06T 19/20 |
| 10,387,963 B1 | 8/2019 | Leise et al. | |
| 10,628,635 B1 | 4/2020 | Carpenter, II et al. | |
| 10,761,691 B2 | 9/2020 | Anzures et al. | |
| 10,769,848 B1* | 9/2020 | Wang | G06T 7/50 |
| 10,813,572 B2 | 10/2020 | Dohrmann et al. | |
| 11,113,943 B2 | 9/2021 | Wright et al. | |
| 11,213,224 B2 | 1/2022 | Dohrmann et al. | |
| 11,410,362 B1* | 8/2022 | Soltani | G06T 9/002 |
| 11,514,633 B1* | 11/2022 | Cetintas et al. | G06F 30/13 |
| 11,733,861 B2* | 8/2023 | Tadros | G06F 3/04883 715/863 |
| 11,823,308 B2* | 11/2023 | Yun | G06T 17/00 |
| 2002/0062342 A1 | 5/2002 | Sidles | |
| 2002/0196944 A1 | 12/2002 | Davis et al. | |
| 2004/0109470 A1 | 6/2004 | Derechin et al. | |
| 2005/0035862 A1 | 2/2005 | Wildman et al. | |
| 2005/0055942 A1 | 3/2005 | Maelzer et al. | |
| 2005/0264416 A1* | 12/2005 | Maurer | G06Q 10/08 342/146 |
| 2007/0032929 A1 | 2/2007 | Yoshioka | |
| 2007/0040692 A1* | 2/2007 | Smith | A61B 5/1115 340/573.1 |
| 2007/0136102 A1* | 6/2007 | Rodgers | G06Q 10/087 348/E7.078 |
| 2007/0194939 A1* | 8/2007 | Alvarez | A61B 5/411 348/E7.086 |
| 2007/0238936 A1 | 10/2007 | Becker | |
| 2008/0010293 A1 | 1/2008 | Zpevak et al. | |
| 2008/0021731 A1* | 1/2008 | Rodgers | G08B 21/0469 348/E7.078 |
| 2008/0186189 A1 | 8/2008 | Azzaro et al. | |
| 2009/0094285 A1 | 4/2009 | Mackle et al. | |
| 2009/0138113 A1* | 5/2009 | Hoguet | G06Q 30/02 700/98 |
| 2009/0160856 A1* | 6/2009 | Hoguet | G06T 17/00 345/420 |
| 2010/0124737 A1 | 5/2010 | Panzer | |
| 2010/0217565 A1* | 8/2010 | Wayne | G06F 30/13 706/54 |
| 2010/0217639 A1* | 8/2010 | Wayne | G06F 30/13 715/810 |
| 2011/0126207 A1 | 5/2011 | Wipfel et al. | |
| 2011/0145018 A1 | 6/2011 | Fotsch et al. | |
| 2011/0208541 A1* | 8/2011 | Wilson | A61G 7/0527 705/2 |
| 2011/0232708 A1 | 9/2011 | Kemp | |
| 2012/0025989 A1 | 2/2012 | Cuddihy et al. | |
| 2012/0026308 A1* | 2/2012 | Johnson | G06V 20/40 348/E7.085 |
| 2012/0075464 A1 | 3/2012 | Derenne et al. | |
| 2012/0120184 A1 | 5/2012 | Fornell et al. | |
| 2012/0121849 A1 | 5/2012 | Nojima | |
| 2012/0154582 A1 | 6/2012 | Johnson et al. | |
| 2012/0165618 A1 | 6/2012 | Algoo et al. | |
| 2012/0179067 A1 | 7/2012 | Wekell | |
| 2012/0179916 A1 | 7/2012 | Staker et al. | |
| 2012/0229634 A1 | 9/2012 | Laett et al. | |
| 2012/0253233 A1 | 10/2012 | Greene et al. | |
| 2012/0323090 A1* | 12/2012 | Bechtel | A61B 5/1113 600/595 |
| 2013/0000228 A1 | 1/2013 | Ovaert | |
| 2013/0016126 A1* | 1/2013 | Wang | G06F 3/041 345/650 |
| 2013/0060167 A1 | 2/2013 | Dracup | |
| 2013/0127620 A1* | 5/2013 | Siebers | A61B 5/1113 340/573.1 |
| 2013/0145449 A1 | 6/2013 | Busser et al. | |
| 2013/0167025 A1 | 6/2013 | Patri et al. | |
| 2013/0204545 A1 | 8/2013 | Solinsky | |
| 2013/0212501 A1 | 8/2013 | Anderson et al. | |
| 2013/0237395 A1 | 9/2013 | Hjelt et al. | |
| 2013/0289449 A1 | 10/2013 | Stone et al. | |
| 2013/0303860 A1 | 11/2013 | Bender et al. | |
| 2014/0128691 A1 | 5/2014 | Olivier | |
| 2014/0148733 A1 | 5/2014 | Stone et al. | |
| 2014/0171039 A1 | 6/2014 | Bjontegard | |
| 2014/0171834 A1 | 6/2014 | DeGoede et al. | |
| 2014/0180725 A1* | 6/2014 | Ton-That | G06Q 10/10 705/4 |
| 2014/0184592 A1* | 7/2014 | Belcher | G06F 8/34 345/420 |
| 2014/0232600 A1 | 8/2014 | Larose et al. | |
| 2014/0243686 A1 | 8/2014 | Kimmel | |
| 2014/0257852 A1 | 9/2014 | Walker et al. | |
| 2014/0267582 A1 | 9/2014 | Beutter et al. | |
| 2014/0278605 A1 | 9/2014 | Borucki et al. | |
| 2014/0330172 A1 | 11/2014 | Jovanov et al. | |
| 2014/0337048 A1 | 11/2014 | Brown et al. | |
| 2014/0358828 A1 | 12/2014 | Phillipps et al. | |
| 2014/0368601 A1 | 12/2014 | deCharms | |
| 2015/0019250 A1 | 1/2015 | Goodman et al. | |
| 2015/0109442 A1 | 4/2015 | Derenne et al. | |
| 2015/0169835 A1 | 6/2015 | Hamdan et al. | |
| 2015/0359467 A1 | 12/2015 | Tran | |
| 2016/0026354 A1 | 1/2016 | McIntosh et al. | |
| 2016/0117470 A1 | 4/2016 | Welsh et al. | |
| 2016/0117484 A1 | 4/2016 | Hanina et al. | |
| 2016/0154977 A1 | 6/2016 | Jagadish et al. | |
| 2016/0180668 A1* | 6/2016 | Kusens | G16H 40/20 340/541 |
| 2016/0183864 A1* | 6/2016 | Kusens | A61B 5/11 340/573.1 |
| 2016/0217264 A1 | 7/2016 | Sanford | |
| 2016/0249241 A1* | 8/2016 | Barmettler | G06F 3/04847 |
| 2016/0253890 A1 | 9/2016 | Rabinowitz et al. | |
| 2016/0267327 A1 | 9/2016 | Franz et al. | |
| 2016/0284178 A1* | 9/2016 | Cushwa, Jr. | G08B 13/08 |
| 2016/0314255 A1 | 10/2016 | Cook et al. | |
| 2017/0000387 A1 | 1/2017 | Forth et al. | |
| 2017/0000422 A1 | 1/2017 | Moturu et al. | |
| 2017/0024531 A1 | 1/2017 | Malaviya | |
| 2017/0055917 A1 | 3/2017 | Stone et al. | |
| 2017/0068419 A1* | 3/2017 | Sundermeyer | H04L 12/2809 |
| 2017/0091885 A1* | 3/2017 | Randolph | G06T 3/00 |
| 2017/0116484 A1* | 4/2017 | Johnson | H04N 23/90 |

(56) References Cited

U.S. PATENT DOCUMENTS

| | | | |
|---|---|---|---|
| 2017/0140631 A1 | 5/2017 | Pietrocola et al. | |
| 2017/0147154 A1 | 5/2017 | Steiner et al. | |
| 2017/0185278 A1* | 6/2017 | Sundermeyer | H04L 12/2818 |
| 2017/0192950 A1 | 7/2017 | Gaither et al. | |
| 2017/0193163 A1 | 7/2017 | Melle et al. | |
| 2017/0195637 A1* | 7/2017 | Kusens | G16H 80/00 |
| 2017/0197115 A1 | 7/2017 | Cook et al. | |
| 2017/0212661 A1* | 7/2017 | Ito | G06F 3/0482 |
| 2017/0213145 A1 | 7/2017 | Pathak et al. | |
| 2017/0263034 A1* | 9/2017 | Kenoff | G06F 3/04842 |
| 2017/0273601 A1 | 9/2017 | Wang et al. | |
| 2017/0337274 A1 | 11/2017 | Ly et al. | |
| 2017/0344706 A1 | 11/2017 | Torres et al. | |
| 2017/0344832 A1 | 11/2017 | Leung et al. | |
| 2017/0358195 A1* | 12/2017 | Bobda | G08B 13/19613 |
| 2018/0005448 A1 | 1/2018 | Choukroun et al. | |
| 2018/0018057 A1* | 1/2018 | Bushnell | G06F 3/0412 |
| 2018/0033279 A1* | 2/2018 | Chong | G06Q 10/0633 |
| 2018/0075558 A1 | 3/2018 | Hill, Sr. et al. | |
| 2018/0154514 A1 | 6/2018 | Angle et al. | |
| 2018/0165938 A1 | 6/2018 | Honda et al. | |
| 2018/0182472 A1 | 6/2018 | Preston et al. | |
| 2018/0189756 A1 | 7/2018 | Purves et al. | |
| 2018/0225885 A1* | 8/2018 | Dishno | G06F 16/9577 |
| 2018/0322405 A1 | 11/2018 | Fadell et al. | |
| 2018/0342081 A1* | 11/2018 | Kim | A61B 5/1117 |
| 2018/0360349 A9 | 12/2018 | Dohrmann et al. | |
| 2018/0368780 A1 | 12/2018 | Bruno et al. | |
| 2019/0013960 A1* | 1/2019 | Sadwick | H05B 47/19 |
| 2019/0029900 A1 | 1/2019 | Walton et al. | |
| 2019/0042700 A1 | 2/2019 | Alotaibi | |
| 2019/0057320 A1 | 2/2019 | Docherty et al. | |
| 2019/0090786 A1* | 3/2019 | Kim | G06N 3/08 |
| 2019/0116212 A1 | 4/2019 | Spinella-Mamo | |
| 2019/0130110 A1 | 5/2019 | Lee et al. | |
| 2019/0164015 A1 | 5/2019 | Jones, Jr. et al. | |
| 2019/0164340 A1* | 5/2019 | Pejic | G06T 19/20 |
| 2019/0196888 A1 | 6/2019 | Anderson et al. | |
| 2019/0205630 A1* | 7/2019 | Kusens | A61B 5/6891 |
| 2019/0214146 A1* | 7/2019 | Dunias | A61B 5/1117 |
| 2019/0220727 A1 | 7/2019 | Dohrmann et al. | |
| 2019/0221315 A1* | 7/2019 | Weffers-Albu | G16H 50/30 |
| 2019/0228866 A1* | 7/2019 | Weffers-Albu | G16H 40/63 |
| 2019/0243928 A1* | 8/2019 | Rejeb Sfar | G06V 10/82 |
| 2019/0259475 A1* | 8/2019 | Dohrmann | G16H 10/20 |
| 2019/0282130 A1 | 9/2019 | Dohrmann et al. | |
| 2019/0286942 A1 | 9/2019 | Abhiram et al. | |
| 2019/0307405 A1* | 10/2019 | Terry | G16H 10/60 |
| 2019/0311792 A1 | 10/2019 | Dohrmann et al. | |
| 2019/0318165 A1 | 10/2019 | Shah et al. | |
| 2019/0323823 A1* | 10/2019 | Atchison | G06F 3/0488 |
| 2019/0362545 A1* | 11/2019 | Pejic | G06T 17/10 |
| 2019/0370617 A1* | 12/2019 | Singh | G06T 11/60 |
| 2019/0385749 A1* | 12/2019 | Dohrmann | G16H 70/00 |
| 2020/0004237 A1* | 1/2020 | Kim | G06F 3/0488 |
| 2020/0057824 A1* | 2/2020 | Yeh | G06F 30/13 |
| 2020/0066415 A1* | 2/2020 | Hettig | G16H 50/30 |
| 2020/0085382 A1* | 3/2020 | Taerum | G06T 7/0016 |
| 2020/0101969 A1 | 4/2020 | Natroshvili et al. | |
| 2020/0151923 A1* | 5/2020 | Bergin | G06T 17/10 |
| 2020/0175889 A1* | 6/2020 | Delson | G09B 5/02 |
| 2020/0251220 A1 | 8/2020 | Chasko | |
| 2020/0279364 A1* | 9/2020 | Sarkisian | G06Q 50/08 |
| 2020/0327261 A1* | 10/2020 | Sawaguchi | G06Q 50/08 |
| 2020/0357256 A1 | 11/2020 | Wright et al. | |
| 2020/0357511 A1 | 11/2020 | Sanford | |
| 2020/0394058 A1* | 12/2020 | Delson | G09B 7/04 |
| 2020/0402245 A1* | 12/2020 | Keraudren | A61N 5/1049 |
| 2021/0007631 A1 | 1/2021 | Dohrmann et al. | |
| 2021/0035468 A1* | 2/2021 | Das | G06N 20/00 |
| 2021/0049812 A1* | 2/2021 | Ganihar | G06T 17/05 |
| 2021/0052757 A1* | 2/2021 | Baarman | A61L 2/24 |
| 2021/0073449 A1* | 3/2021 | Segev | G06F 30/27 |
| 2021/0150088 A1* | 5/2021 | Gallo | G06V 30/422 |
| 2021/0165561 A1* | 6/2021 | Wei | G06T 19/20 |
| 2021/0217236 A1* | 7/2021 | Bavastro | G06T 17/10 |
| 2021/0232719 A1* | 7/2021 | Ganihar | G06T 17/10 |
| 2021/0256177 A1* | 8/2021 | Voss | G06T 7/11 |
| 2021/0273962 A1 | 9/2021 | Dohrmann et al. | |
| 2021/0333554 A1* | 10/2021 | Ohno | G06Q 10/20 |
| 2021/0358202 A1 | 11/2021 | Tveito et al. | |
| 2021/0365602 A1* | 11/2021 | Gifford | G06T 17/00 |
| 2021/0398410 A1 | 12/2021 | Wright et al. | |
| 2022/0022760 A1 | 1/2022 | Salcido et al. | |
| 2022/0026920 A1* | 1/2022 | Ebrahimi Afrouzi | B25J 9/1664 |
| 2022/0036656 A1* | 2/2022 | Garcia | G06T 19/20 |
| 2022/0058865 A1* | 2/2022 | Beltrand | G06N 3/045 |
| 2022/0058866 A1* | 2/2022 | Beltrand | G06N 3/08 |
| 2022/0108561 A1* | 4/2022 | Groß | G06V 40/25 |
| 2022/0117515 A1 | 4/2022 | Dohrmann et al. | |
| 2022/0156428 A1* | 5/2022 | Myers | G06T 11/203 |
| 2022/0164097 A1* | 5/2022 | Tadros | G06F 3/0412 |
| 2022/0207198 A1* | 6/2022 | Mantraratnam | G06F 30/12 |
| 2022/0274019 A1* | 9/2022 | Delmonico | G06F 16/9537 |
| 2022/0277518 A1* | 9/2022 | Bavastro | G06F 30/12 |
| 2022/0292230 A1* | 9/2022 | Murphy | G06F 30/27 |
| 2022/0292421 A1* | 9/2022 | Murphy | G06V 10/82 |
| 2022/0329973 A1* | 10/2022 | Karmanov | G06N 20/00 |
| 2022/0331028 A1* | 10/2022 | Sternitzke | G05D 1/0094 |
| 2022/0337972 A1* | 10/2022 | Karmanov | G01S 5/0278 |
| 2022/0351470 A1* | 11/2022 | Enthed | G06T 19/006 |
| 2022/0358258 A1* | 11/2022 | Sica | G06F 3/04845 |
| 2022/0358739 A1* | 11/2022 | Enthed | G06V 20/70 |
| 2022/0366813 A1* | 11/2022 | Shaw | A63H 33/044 |
| 2022/0383572 A1* | 12/2022 | Hu | G06V 10/774 |
| 2022/0399113 A1* | 12/2022 | Dohrmann | G16H 40/67 |
| 2023/0014580 A1* | 1/2023 | Zhu | G01C 21/3867 |
| 2023/0093571 A1* | 3/2023 | Aoki | G09B 5/06 |
| 2023/0162413 A1* | 5/2023 | Batra | G06T 7/194 |
| | | | 345/441 |
| 2023/0162704 A1* | 5/2023 | Li | G06F 3/041 |
| | | | 345/173 |
| 2023/0222887 A1* | 7/2023 | Muhsin | G06V 40/20 |
| 2023/0243649 A1* | 8/2023 | Pershing | G06F 17/00 |
| | | | 382/199 |
| 2023/0301522 A1* | 9/2023 | Tan | G06V 20/52 |
| 2023/0368900 A1* | 11/2023 | Dontsova | G16H 50/30 |
| 2023/0376639 A1* | 11/2023 | Lambourne | G06V 10/82 |
| 2023/0410452 A1* | 12/2023 | Beltrand | G06F 30/27 |
| 2024/0049991 A1* | 2/2024 | Chronis | G06T 7/0012 |

FOREIGN PATENT DOCUMENTS

| | | |
|---|---|---|
| CN | 104361321 A | 2/2015 |
| CN | 106056035 A | 10/2016 |
| CN | 107411515 A | 12/2017 |
| CN | 111801645 A | 10/2020 |
| CN | 111801939 A | 10/2020 |
| CN | 111867467 A | 10/2020 |
| CN | 113795808 | 12/2021 |
| EP | 3740856 A1 | 11/2020 |
| EP | 3756344 A1 | 12/2020 |
| EP | 3768164 A1 | 1/2021 |
| EP | 3773174 A1 | 2/2021 |
| EP | 3815108 A1 | 5/2021 |
| EP | 3920797 A1 | 12/2021 |
| EP | 3944258 | 1/2022 |
| EP | 3966657 A | 3/2022 |
| IN | 202027033318 A | 10/2020 |
| IN | 202027035634 A | 10/2020 |
| IN | 202127033278 A | 8/2022 |
| JP | 2002304362 A | 10/2002 |
| JP | 2005228305 A | 8/2005 |
| JP | 2010172481 A | 8/2010 |
| JP | 2012232652 A | 11/2012 |
| JP | 2016137226 A | 8/2016 |
| JP | 2016525383 A | 8/2016 |
| JP | 2021510881 A | 4/2021 |
| JP | 2021524075 A | 9/2021 |
| JP | 2022519283 A | 3/2022 |
| KR | 1020160040078 A | 4/2016 |
| KR | 1020200105519 A | 9/2020 |

(56) References Cited

FOREIGN PATENT DOCUMENTS

| KR | 1020200121832 A | 10/2020 |
|---|---|---|
| KR | 1020200130713 A | 11/2020 |
| WO | WO2000005639 A2 | 2/2000 |
| WO | WO2014043757 A1 | 3/2014 |
| WO | WO2017118908 A1 | 7/2017 |
| WO | WO2018032089 A1 | 2/2018 |
| WO | WO2019143397 A1 | 7/2019 |
| WO | WO2019164585 A1 | 8/2019 |
| WO | WO2019182792 A1 | 9/2019 |
| WO | WO2019199549 A1 | 10/2019 |
| WO | WO2019245713 A1 | 12/2019 |
| WO | WO2020163180 A1 | 8/2020 |
| WO | WO2020227303 A1 | 11/2020 |

OTHER PUBLICATIONS

S. Kuwabara, R. Ohbuchi and T. Furuya, "Query by Partially-Drawn Sketches for 3D Shape Retrieval," 2019 International Conference on Cyberworlds (CW), Kyoto, Japan, 2019, pp. 69-76, doi: 10.1109/CW.2019.00020. (Year: 2019).*

Wanchao Su, Dong Du, Xin Yang, Shizhe Zhou, and Hongbo Fu. 2018. Interactive Sketch-Based Normal Map Generation with Deep Neural Networks. Proc. ACM Comput. Graph. Interact. Tech. 1, 1, Article 22 (Jul. 2018), 17 pages. https://doi.org/10.1145/3203186 (Year: 2018).*

Phillip Isola, Jun-Yan Zhu, Tinghui Zhou, and Alexei A. Efros, "Image-to-Image Translation with Conditional Adversarial Networks" 2018, arXiv:1611.07004 [cs.CV] (or arXiv:1611.07004v3 [cs.CV] for this version) https://doi.org/10.48550/arXiv.1611.07004 (Year: 2018).*

Mathias Eitz, Ronald Richter, Tamy Boubekeur, Kristian Hildebrand, and Marc Alexa. 2012. Sketch-based shape retrieval. ACM Trans. Graph. 31, 4, Article 31 (Jul. 2012), 10 pages. https://doi.org/10.1145/2185520.2185527 (Year: 2012).*

T. Furuya and R. Ohbuchi, "Ranking on Cross-Domain Manifold for Sketch-Based 3D Model Retrieval," 2013 International Conference on Cyberworlds, Yokohama, Japan, 2013, pp. 274-281, doi: 10.1109/CW.2013.60. (Year: 2013).*

Fang Wang, Le Kang and Yi Li, "Sketch-based 3D shape retrieval using Convolutional Neural Networks," 2015 IEEE Conference on Computer Vision and Pattern Recognition (CVPR), Boston, MA, 2015, pp. 1875-1883, doi: 10.1109/CVPR.2015.7298797. (Year: 2015).*

"Extended European Search Report", European Patent Application No. 19772545.0, Nov. 16, 2021, 8 pages.

"Office Action", India Patent Application No. 202027033318, Nov. 18, 2021, 6 pages.

"Office Action", Australia Patent Application No. 2018409860, Nov. 30, 2021, 4 pages.

"Office Action", Australia Patent Application No. 2018403182, Dec. 1, 2021, 3 pages.

"Ofice Action", Korea Patent Application No. 10-2020-7028606, Oct. 29, 2021, 7 pages [14 pages with translation].

"Office Action", Japan Patent Application No. 2020-543924, Nov. 24, 2021, 3 pages [6 pages with translation].

"Extended European Search Report", European Patent Application No. EP19785057, Dec. 6, 2021, 8 pages.

"Office Action", Australia Patent Application No. 2020218172, Dec. 21, 2021, 4 pages.

"Extended European Search Report", European Patent Application No. 21187314.6, Dec. 10, 2021, 10 pages.

"Notice of Allowance", Australia Patent Application No. 2018403182, Jan. 20, 2022, 4 pages.

"Office Action", Australia Patent Application No. 2018409860, Jan. 24, 2022, 5 pages.

"Office Action", China Patent Application No. 201880089608.2, Feb. 8, 2022, 6 pages (15 pages with translation).

"International Search Report" and "Written Opinion of the International Searching Authority," Patent Cooperation Treaty Application No. PCT/US2021/056060, Jan. 28, 2022, 8 pages.

"Extended European Search Report", European Patent Application No. 19822930.4, Feb. 15, 2022, 9 pages.

"Office Action", Japan Patent Application No. 2020-550657, Feb. 8, 2022, 8 pages.

"Office Action", Singapore Patent Application No. 11202008201P, Apr. 4, 2022, 200 pages.

"Office Action", India Patent Application No. 202127033278, Apr. 20, 2022, 7 pages.

"Office Action", Canada Patent Application No. 3088396, May 6, 2022, 4 pages.

"International Search Report" and "Written Opinion of the International Searching Authority," Patent Cooperation Treaty Application No. PCT/US2018/057814, Jan. 11, 2019, 9 pages.

"International Search Report" and "Written Opinion of the International Searching Authority," Patent Cooperation Treaty Application No. PCT/US2018/068210, Apr. 12, 2019, 9 pages.

"International Search Report" and "Written Opinion of the International Searching Authority," Patent Cooperation Treaty Application No. PCT/US2019/021678, May 24, 2019, 12 pages.

"International Search Report" and "Written Opinion of the International Searching Authority," Patent Cooperation Treaty Application No. PCT/US2019/025652, Jul. 18, 2019, 11 pages.

"International Search Report" and "Written Opinion of the International Searching Authority," Patent Cooperation Treaty Application No. PCT/US2019/034206, Aug. 1, 2019, 11 pages.

Rosen et al., "Slipping and Tripping: Fall Injuries in Adults Associated with Rugs and Carpets," Journal of Injury & Violence Research, 5(1), (2013), pp. 61-69.

Bajaj, Prateek, "Reinforcement Learning", GeeksForGeeks.org [online], [retrieved on Mar. 4, 2020], Retrieved from the Internet:<URL:https://www.geeksforgeeks.org/what-is-reinforcement-learning/>, 7 pages.

Kung-Hsiang, Huang (Steeve), "Introduction to Various RL Algorithms. Part I (Q-Learning, SARSA, DQN, DDPG)", Towards Data Science, [online], [retrieved on Mar. 4, 2020], Retrieved from the Internet:<URL:https://towardsdatascience.com/introduction-to-various-reinforcement-learning-algorithms-i-q-learning-sarsa-dqn-ddpg-72a5e0cb6287>, 5 pages.

Bellemare et al., A Distributional Perspective on Reinforcement Learning:, Proceedings of the 34th International Conference on Machine Learning, Sydney, Australia, Jul. 21, 2017, 19 pages.

Friston et al., "Reinforcement Learning or Active Inference?" Jul. 29, 2009, [online], [retrieved on Mar. 4, 2020], Retrieved from the Internet:<URL:https://doi.org/10.1371/journal.pone.0006421 PLOS ONE 4(7): e6421>, 13 pages.

Zhang et al., "DQ Scheduler: Deep Reinforcement Learning Based Controller Synchronization in Distributed SDN" ICC 2019—2019 IEEE International Conference on Communications (ICC), Shanghai, China, doi: 10.1109/ICC.2019.8761183, pp. 1-7.

"International Search Report" and "Written Opinion of the International Searching Authority," Patent Cooperation Treaty Application No. PCT/US2020/031486, Aug. 3, 2020, 7 pages.

"International Search Report" and "Written Opinion of the International Searching Authority," Patent Cooperation Treaty Application No. PCT/US2020/016248, May 11, 2020, 7 pages.

"Office Action", Australia Patent Application No. 2019240484, Nov. 13, 2020, 4 pages.

"Office Action", Australia Patent Application No. 2018403182, Feb. 5, 2021, 5 pages.

"Office Action", Australia Patent Application No. 2018409860, Feb. 10, 2021, 4 pages.

Leber, Jessica, "The Avatar Will See You Now", MIT Technology Review, Sep. 17, 2013, 4 pages.

"Office Action", India Patent Application No. 202027035634, Jun. 30, 2021, 10 pages.

"Office Action", India Patent Application No. 202027033121, Jul. 29, 2021, 7 pages.

"Office Action", Canada Patent Application No. 3088396, Aug. 6, 2021, 7 pages.

"Office Action", China Patent Application No. 201880089608.2, Aug. 3, 2021, 8 pages [17 pages with translation].

(56) References Cited

OTHER PUBLICATIONS

"Office Action", Japan Patent Application No. 2020-543924, Jul. 27, 2021, 3 pages [6 pages with translation].
"Office Action", Australia Patent Application No. 2019240484, Aug. 2, 2021, 3 pages.
"Office Action", Canada Patent Application No. 3089312, Aug. 19, 2021, 3 pages.
"Extended European Search Report", European Patent Application No. 18901139.8, Sep. 9, 2021, 6 pages.
"Office Action", Canada Patent Application No. 3091957, Sep. 14, 2021, 4 pages.
"Office Action", Japan Patent Application No. 2020-540382, Aug. 24, 2021, 7 pages [13 pages with translation].
"Extended European Search Report", European Patent Application No. 18907032.9, Oct. 15, 2021, 12 pages.
Marston et al., "The design of a purpose-built exergame for fall prediction and prevention for older people", European Review of Aging and Physical Activity 12:13, <URL:https://eurapa.biomedcentral.com/track/pdf/10.1186/s11556-015-0157-4.pdf>, Dec. 8, 2015, 12 pages.
Ejupi et al., "Kinect-Based Five-Times-Sit-to-Stand Test for Clinical and In-Home Assessment of Fall Risk in Older People", Gerontology (vol. 62), (May 28, 2015), <URL:https://www.karger.com/Article/PDF/381804>, May 28, 2015, 7 pages.
Festl et al., "iStoppFalls: A Tutorial Concept and prototype Contents", <URL:https://hcisiegen.de/wp-uploads/2014/05/isCtutoriaL.doku.pdf>, Mar. 30, 2013, 36 pages.
"Notice of Allowance", Australia Patent Application No. 2019240484, Oct. 27, 2021, 4 pages.

\* cited by examiner

ROOM LABELING DRAWING INTERFACE FOR ACTIVITY TRACKING AND DETECTION

CROSS REFERENCE TO RELATED APPLICATIONS

The present application claims the priority benefit of U.S. Provisional Patent Application Ser. No. 63/024,375 filed on May 13, 2020 and titled "Room Labeling Drawing Interface for Activity Tracking and Detection," which is hereby incorporated by reference in its entirety.

FIELD OF TECHNOLOGY

Exemplary systems and methods create a three-dimensional (3D) model of a dwelling using a two-dimensional (2D) sketch and real-time user feedback to create an accurate map with location tagging. In particular but not by way of limitation, exemplary embodiments provide the ability for a 3D map to be created and have its location automatically communicated through internet connectivity or cellular network access.

SUMMARY OF EXEMPLARY EMBODIMENTS

Exemplary embodiments include an intelligent secure networked architecture configured by at least one processor to execute instructions stored in memory, the architecture comprising a data retention system and a machine learning system, a web services layer providing access to the data retention and machine learning systems, an application server layer that provides a user-facing application that accesses the data retention and machine learning systems through the web services layer and performs processing based on user interaction with an interactive graphical user interface provided by the user-facing application, the user-facing application configured to execute instructions for a method for room labeling for activity tracking and detection, the method including making a 2D sketch of a first room on an interactive graphical user interface, and using machine learning to turn the 2D sketch of the first room into a 3D model of the first room.

Additionally, exemplary methods include transmitting the 2D sketch of the first room using an internet or cellular network to a series of cloud-based services, using input data from the 2D sketch of the first room to generate the 3D model of the first room with an estimated dimension, making a 2D sketch of a second room on an interactive graphical user interface, using machine learning to turn the 2D sketch of the second room into a 3D model of the second room, using machine learning to combine the 3D model of the first room and the 3D model of the second room, updating a dimension of the 3D model of the first room and a dimension of the 3D model of the second room and using machine learning to create a 3D model of a dwelling.

Various exemplary methods include placing a device having an interactive graphical user interface, an integrated camera and a geolocator in one or more rooms of the dwelling, associating a physical address with the dwelling, tracking activity in the one or more rooms of the dwelling, and transmitting the tracking activity in the one or more rooms of the dwelling using an internet or cellular network to a series of cloud-based services.

Further exemplary methods include the machine learning utilizing a convolutional neural network and using back-propagation to train the convolutional neural network. The 2D sketch of the first room may be received by an input layer of the trained convolutional neural network, the 2D sketch of the first room being processed through an additional layer of the trained convolutional neural network, and the 2D sketch of the first room being processed through an output layer of the trained convolutional neural network, resulting in the 3D model of the first room.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Summary of the figures.

FIG. 1—Touchscreen display of the user interface, where a user makes a 2D sketch.

FIG. 2—Algorithm for input data using Machine Learning to turn the 2D sketch into a 3D model.

DETAILED DESCRIPTION

Figure 1:
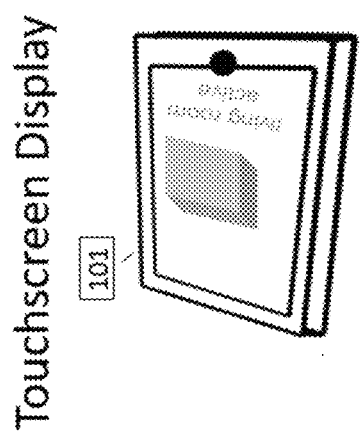
FIG. 1 shows the process of a user interacting with the touchscreen device by using their finger to draw a square that represents a room in their dwelling.
Figure 1:
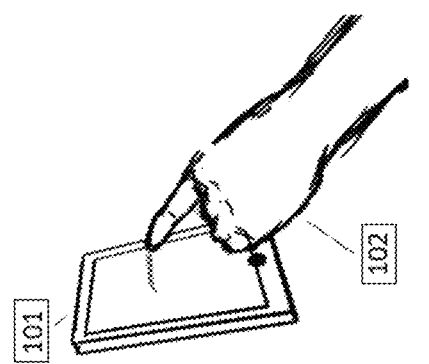
Figure 1:
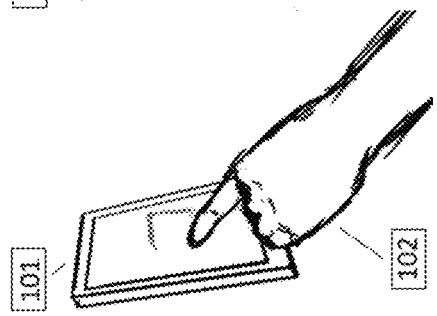
Figure 1:
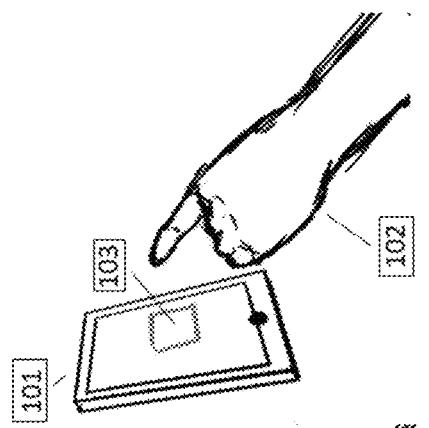

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Various exemplary embodiments allow for quick creation of a 3D model of a dwelling that would immediately communicate its location upon creation. This allows for a number of uses, including, but not limited to, the ability to track patients as they move about a residence. Tracking the location of a person within their dwelling is often necessary as part of a plan of care for patients with diseases such as dementia. Having an accurate layout and location of a place of residence and an ability to track movement within the residence allows for quick response if emergency services need to be sent, or if the patient wanders out of the house.

Provided herein are exemplary systems for creating a three-dimensional (3D) model of a dwelling using a touch interface with integrated camera, a two-dimensional (2D) sketch, and a labeling system in order to immediately communicate the location of the model through internet connectivity or cellular access. This system would also allow for remote tracking of location and activity within the dwelling. By drawing on the device in the home, the location and map would be collected at the same time, allowing for geo-tagging within a small environment. The device would inherently know its location within a room based on the drawing that the user will provide. This will then give users and authorized personnel access to real-time feedback of activity within the dwelling.

Using a touch interface, the user will provide a sketch of their residence through guided interaction. The interface will prompt the user to draw a 2D template of the room they are currently occupying. The interface would then prompt the user to draw adjacent and successive rooms throughout the residence in order to create a floor plan of the dwelling. Machine Learning (ML) models will then interpret the drawings and adjust for real-world dimensions in order to produce a more accurate model of the residence. Given a multi-device interface mesh-system, the interface will prompt the user to identify any other rooms in the 3D model that additional devices reside in. As the model is created, it will also be uploaded through internet connectivity or cellular networks in order to broadcast the location. This provides a way for the integrated cameras within the devices to remotely monitor activity and traffic throughout the dwelling in order to respond to any emergencies that might arise.

FIG. 1 demonstrates the user interacting with the touchscreen device. In this figure, the user is drawing an initial sketch of the room they are in. This device maps this into 3D and does so for each consecutive room, as it is in the room it is mapping.

Referring to FIG. 1, various exemplary embodiments use a touchscreen interface (101) located within a user's (102) dwelling to collect a two-dimensional drawing (103) representing the dwelling. After the user completes 103, the data are transmitted from 101 using either the internet or cellular network to a series of cloud-based services. Throughout the processes, all data are secured using AES-256 bit encryption, whether data are in transit or at rest.

Figure 2:
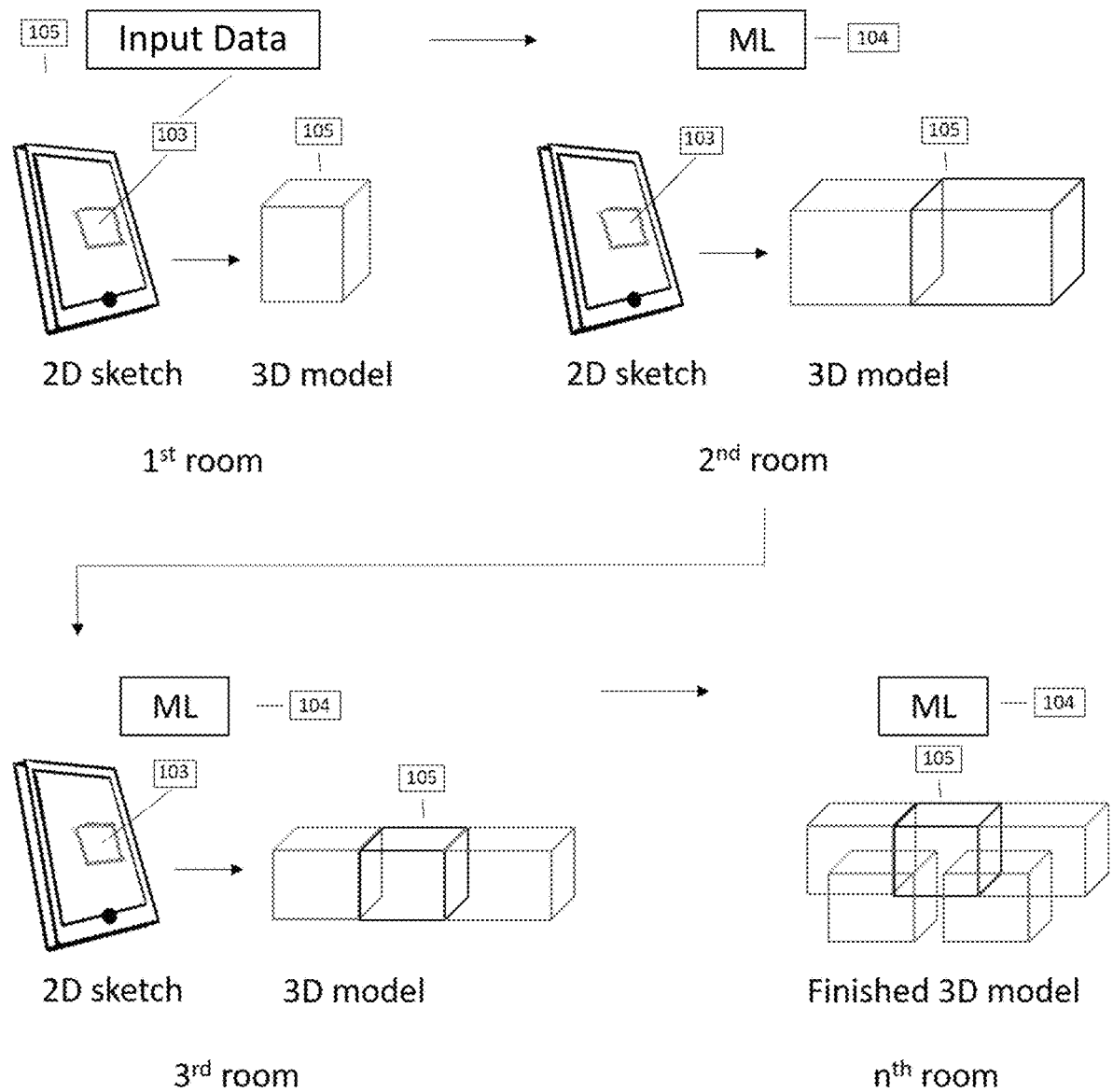
FIG. 2 then shows the 2D images being run through ML processes to be transformed into a 3D model that can be labeled and displayed back to the user, as displayed in FIG. 3.

In FIG. 2, input data from the user's 2D sketch on the interface becomes a 3D model from the first room with estimated dimensions. Then the user continues to the second room and draws a 2D sketch of the second room. From there, ML algorithms add this room to the room previously sketched and modeled, with updated dimensions of both.

In some exemplary embodiments, a convolutional neural network, CNN, may be used as a machine learning model. Additionally, in some exemplary embodiments, backpropagation may be used to train the convolutional neural network. In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are commonly used. The backpropagation algorithm works by computing the gradient of the loss function with respect to each weight by the chain rule, computing the gradient one layer at a time, iterating backward from the last layer to avoid redundant calculations of intermediate terms in the chain rule.

A trained convolutional neural network is used to pass the 2D sketch—represented as a matrix of numbers where each number represents the value of an individual pixel—through an input layer. The specifications of the input layer are dependent on the format and number of channels contained within the initial sketch. For instance, a grayscale image would consist of a matrix of two dimensions (width and height), whereas a color image would consist of three dimensions (width, height, and channel). This data is then processed through a number of convolutional layers—eventually leading to an output layer wherein the 3D model is provided in the form of a matrix of numbers representing the dimensions of the dwelling. As the rooms are mapped, machine learning models are used to continuously adjust the 3D specifications of the rooms to better match the learned representations of how rooms connect to each other—which were acquired during model training.

As the user sketches each room, they see a 3D view in real-time. This includes the first room, although the ML algorithm improves the real-world dimensions of each room being added to the map consecutively. Illustrated here as an example, once the user sketches the second room, the length of the first room has increased. Then by the time the user has sketched the third room, the first two rooms mapped are shorter in height, and have decreased in length. This process continues until the last room (the nth room) is mapped.

Figure 3:
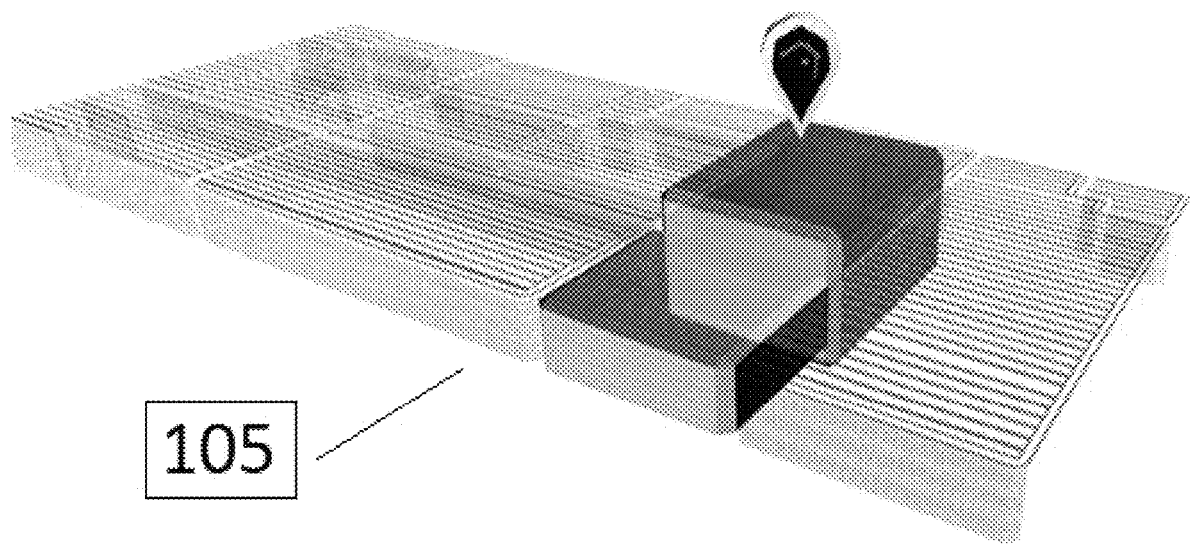
FIG. 3—Finished 3D model of the environment from the user's collective 2D sketches.

In FIG. 2, 103 is then processed through Machine Learning (ML) (104) to create a three-dimensional model (105) of the dwelling. The physical location of the dwelling is then tied to 105, so that tracking within the model can be accomplished through the use of cameras attached to 101. 105 is then displayed on 101 for verification by 102, as seen in FIG. 3. Using 101, 102 can correct any errors immediately, with those updated data being transmitted through the internet or cellular network simultaneously. 102 can then select any segments of 105 that contain 101, allowing for tracking throughout multiple rooms. This tracking can then be transmitted by 105, to the internet or cellular network and communicated to any third parties previously selected by 102.

FIG. 3 is a complete 3D model from the 2D sketches made by the user. At this point, the user has made 2D sketches of rooms one through "n", where n is the last room, and the real-world dimensions of the environment have become more accurate.

Figure 4:
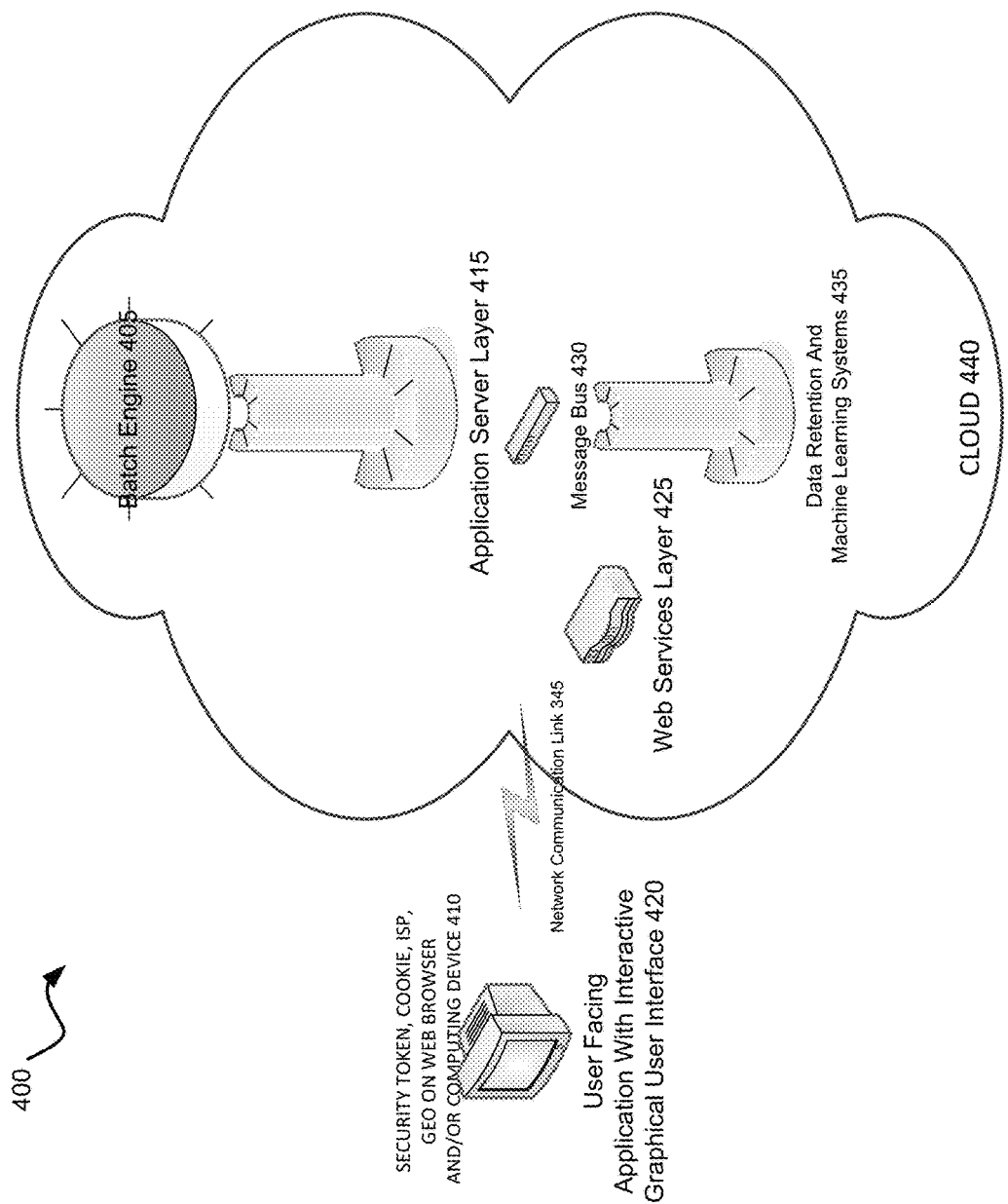
FIG. 4—Exemplary architecture that can be used to practice aspects of the present technology.

FIG. 4 is a schematic diagram of an exemplary intelligent secure networked architecture (hereinafter architecture 400) for practicing aspects of the present disclosure. The architecture 400 comprises batch engine 405, data retention and machine learning systems 435, a web services layer 425, message bus 430, network communication link 345, security token, cookie, internet service provider ("ISP"), geolocator on web browser and/or computing device 410, cloud 440, and an application server layer 415.

In some embodiments, the data retention and machine learning systems 435 are in secure isolation from a remainder of the intelligent secure networked architecture 400 through a security protocol or layer. The data retention and machine learning systems 435 can also provide (in addition to machine learning) additional services such as logic, data analysis, risk model analysis, security, data privacy controls, data access controls, disaster recovery for data and web services—just to name a few.

The web services layer 425 generally provides access to the data retention and machine learning systems 435. According to some embodiments, the application server layer 415 is configured to provide a user-facing application with an interactive graphical user interface (also called user-facing application) 420 that accesses the data retention and machine learning systems 435 through the web services layer 425. In some embodiments, the user-facing application with an interactive graphical user interface 420 is secured through use of a security token and/or cookie cached on the user-facing application with an interactive graphical user interface 420.

In one or more embodiments, the application server layer 415 performs asynchronous processing based on user interaction with the user-facing application and/or the interactive graphical user interface. The user-facing application may reside and execute on the application server layer 415. In other embodiments, the user-facing application may reside with the data retention and machine learning systems 435. In another embodiment, the user-facing application can be a client-side, downloadable application.

The architecture of the present disclosure implement security features that involve the use of multiple security tokens to provide security in the architecture 400. Security tokens are used between the web services layer 425 and application server layer 415. In some embodiments, security features are not continuous to the web browser 410. Thus, a second security layer or link is established between the web browser 410 and application server layer, 415. In one or more embodiments, a first security token is cached in the application server layer 415 between the web browser 410 and the application server layer 415.

In some embodiments, the architecture 400 implements an architected message bus 430. In an example usage, a user requests a refresh of their data and interactive graphical user interface 420 through their web browser 410. Rather than performing the refresh, which could involve data intensive and/or compute or operational intensive procedures by the architecture 400, the message bus 430 allows the request for refresh to be processed asynchronously by a batching process and provides a means for allowing the web browser 410 to continue to display a user-facing application 420 to the user, allowing the user to continue to access data without waiting on the architecture 400 to complete its refresh.

In some exemplary embodiments, latency may be remediated at the user-facing application based on the manner with which the user-facing application is created and how the data that is displayed through the user-facing application is stored and updated. For example, data displayed on the user-facing application that changes frequently can cause frequent and unwanted refreshing of the entire user-facing application and Graphical User Interfaces ("GUIs"). The present disclosure provides a solution to this issue by separating what is displayed on the GUI with the actual underlying data. The underlying data displayed on the GUI of the user-facing application 420 can be updated, as needed, on a segment-by-segment basis (could be defined as a zone of pixels on the display) at a granular level, rather than updating the entire GUI. That is, the GUI that renders the underlying data is programmatically separate from the underlying data cached by the client (e.g., device rendering the GUIs of the user-facing application). Due to this separation, when data being displayed on the GUI changes, re-rendering of the data is performed at a granular level, rather than at the page level. This process represents another example solution that remedies latency and improves user experiences with the user-facing application.

To facilitate these features, the web browser 410 will listen on the message bus 430 for an acknowledgement or other confirmation that the background processes update the user account and/or the user-facing application has been completed by the application server layer 415. The user-facing application (or even part thereof) is updated as the architecture 400 completes its processing. This allows the user-facing application 420 provided through the web browser 410 to be usable, but heavy lifting is being done transparently to the user by the application server layer 415. In sum, these features prevent or reduce latency issues even when an application provided through the web browser 410 is "busy." For example, a re-balance request is executed transparently by the application server layer 415 and batch engine 405. This type of transparent computing behavior by the architecture 400 allows for asynchronous operation (initiated from the application server layer 415 or message bus 430).

In some embodiments, a batch engine 405 is included in the architecture 400 and works in the background to process re-balance requests and to coordinate a number of services. The batch engine 405 will transparently orchestrate the necessary operations required by the application server layer 415 to obtain data.

According to some embodiments, the batch engine 405 is configured to process requests transparently to a user so that the user can continue to use the user-facing application 420 without disruption. For example, this transparent processing can occur when the application server layer 415 transmits a request to the web services layer 425 for data, and a time required for updating or retrieving the data meets or exceeds a threshold. For example, the threshold might specify that if the request will take more than five seconds to complete, then the batch engine 405 can process the request transparently. The selected threshold can be system configured.

In some embodiments, security of data transmission through the architecture 400 is improved by use of multiple security tokens. In one embodiment, a security token cached on the web browser 410 is different from a security protocol or security token utilized between the application server layer 415 and the web services layer 425.

The architecture 400 may communicatively couple with the user facing application with interactive graphical user interface 420 (or client) via a public or private network, such as network. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

It will be understood that the functionalities described herein, which are attributed to the architecture and user facing application may also be executed within the client. That is, the client may be programmed to execute the functionalities described herein. In other instances, the architecture and client may cooperate to provide the functionalities described herein, such that the client is provided with a client-side application that interacts with the architecture such that the architecture and client operate in a client/server relationship. Complex computational features may be executed by the architecture, while simple operations that require fewer computational resources may be executed by the client, such as data gathering and data display.

In general, a user interface module may be executed by the architecture to provide various graphical user interfaces (GUIs) that allow users to interact with the architecture. In some instances, GUIs are generated by execution of the user facing application itself. Users may interact with the architecture using, for example, a client. The architecture may generate web-based interfaces for the client.

In the description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. An intelligent secure networked architecture configured by at least one processor to execute instructions stored in memory, the architecture comprising:
   a data retention system and a machine learning system;
   a web services layer providing access to the data retention and the machine learning systems; and
   an application server layer that:
      provides a user-facing application that accesses the data retention and the machine learning systems through the web services layer; and
      performs processing based on user interaction with an interactive graphical user interface provided by the user-facing application, the user-facing application configured to execute instructions for a method for room labeling for activity tracking and detection, the method comprising:
   making a 2D sketch of a first room on the interactive graphical user interface, comprising:
   prompting a user, via guided interaction, to draw the 2D sketch of the first room;
   using machine learning to turn the 2D sketch of the first room represented as a matrix of numbers where each number represents a value of an individual pixel into a 3D model in a form of a matrix of numbers representing dimensions of the first room;
   correcting an error within the 3D model;
   performing the processing transparently to the user without disruption with an exceeded threshold triggering the processing transparently; and
   tracking a location and movement of a dementia patient within the 3D model in real-time for an emergency response.

2. The intelligent secure networked architecture of claim 1, the method further comprising transmitting the 2D sketch of the first room using an internet or cellular network to a series of cloud-based services.

3. The intelligent secure networked architecture of claim 1, the method further comprising using input data from the 2D sketch of the first room to generate the 3D model of the first room with an estimated dimension.

4. The intelligent secure networked architecture of claim 1, the method further comprising making a 2D sketch of a second room on the interactive graphical user interface.

5. The intelligent secure networked architecture of claim 4, the method further comprising using the machine learning to turn the 2D sketch of the second room into a 3D model of the second room.

6. The intelligent secure networked architecture of claim 5, the method further comprising using the machine learning to combine the 3D model of the first room and the 3D model of the second room.

7. The intelligent secure networked architecture of claim 6, the method further comprising updating a dimension of the 3D model of the first room and a dimension of the 3D model of the second room.

8. The intelligent secure networked architecture of claim 7, the method further comprising using the machine learning to create a 3D model of a dwelling.

9. The intelligent secure networked architecture of claim 8, the method further comprising placing a device having the interactive graphical user interface, an integrated camera and a geolocator in each room of the dwelling.

10. The intelligent secure networked architecture of claim 9, the method further comprising associating a physical address with the dwelling.

11. The intelligent secure networked architecture of claim 10, the method further comprising tracking activity in each room of the dwelling.

12. The intelligent secure networked architecture of claim 11, the method further comprising transmitting the tracking activity in each room of the dwelling using an internet or cellular network to a series of cloud-based services.

13. The intelligent secure networked architecture of claim 1, wherein the machine learning utilizes a convolutional neural network.

14. The intelligent secure networked architecture of claim 13, further comprising using backpropagation to train the convolutional neural network.

15. The intelligent secure networked architecture of claim 14, wherein the 2D sketch of the first room is received by an input layer of the trained convolutional neural network.

16. The intelligent secure networked architecture of claim 15, further comprising the 2D sketch of the first room being processed through an additional layer of the trained convolutional neural network.

17. The intelligent secure networked architecture of claim 16, further comprising the 2D sketch of the first room being processed through an output layer of the trained convolutional neural network, resulting in the 3D model of the first room.

18. The intelligent secure networked architecture of claim 1, further comprising using multiple security tokens.

19. The intelligent secure networked architecture of claim 1, further comprising using a security token cached on a web browser.

20. The intelligent secure networked architecture of claim 1, further comprising using a security token between the application server layer and the web services layer.

\* \* \* \* \*